Dec. 11, 1962  J. E. GROVE  3,067,893
PORTABLE, ELEVATABLE WORK HANDLING AND LOCATING TABLE
Filed Nov. 19, 1958  4 Sheets-Sheet 1

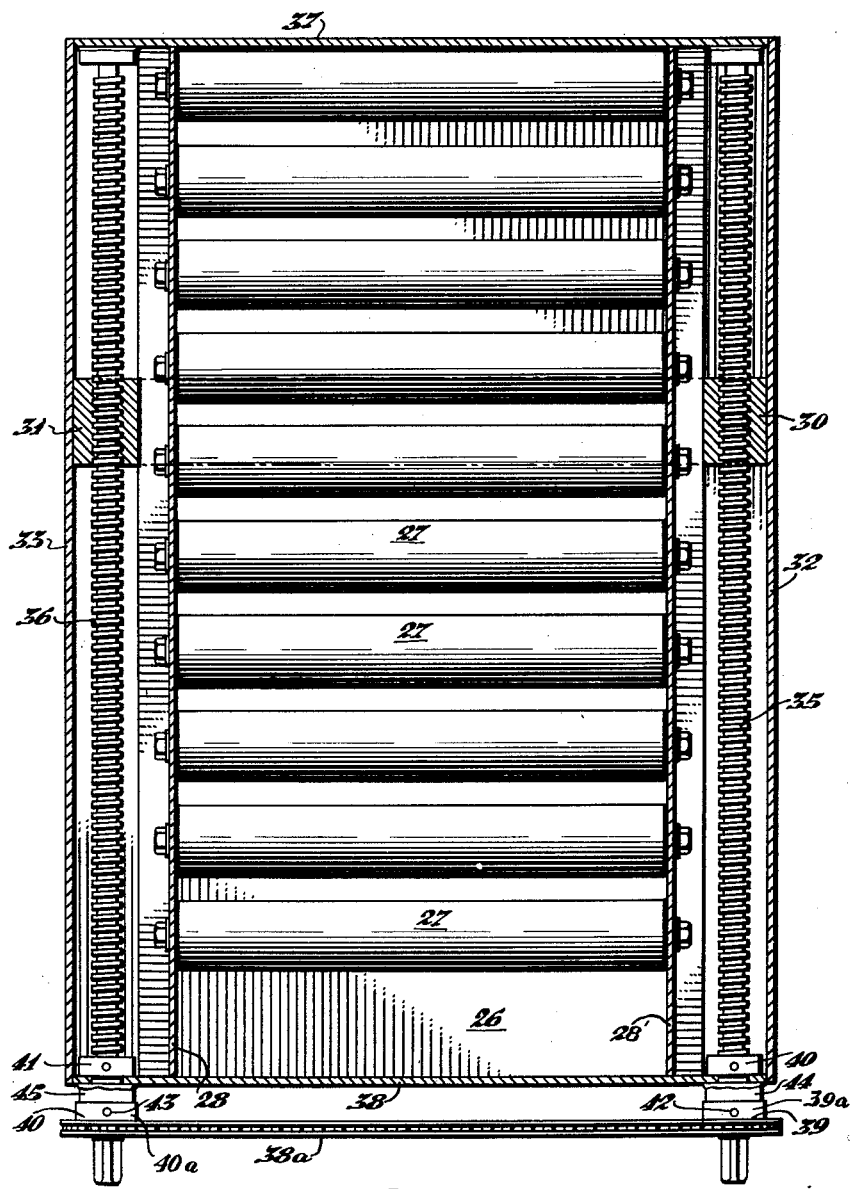

INVENTOR.
JAMES E. GROVE
BY
ATTORNEY

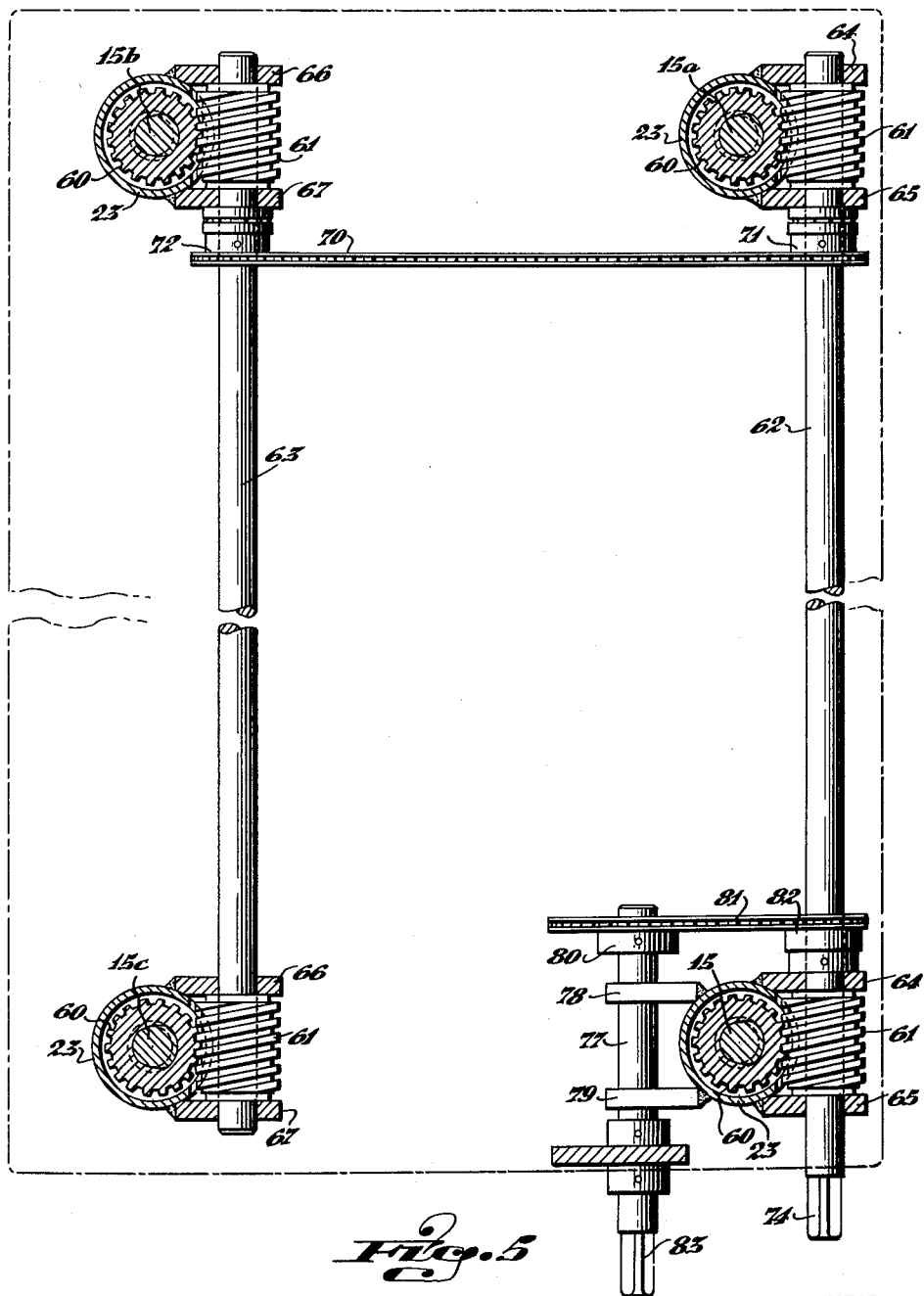

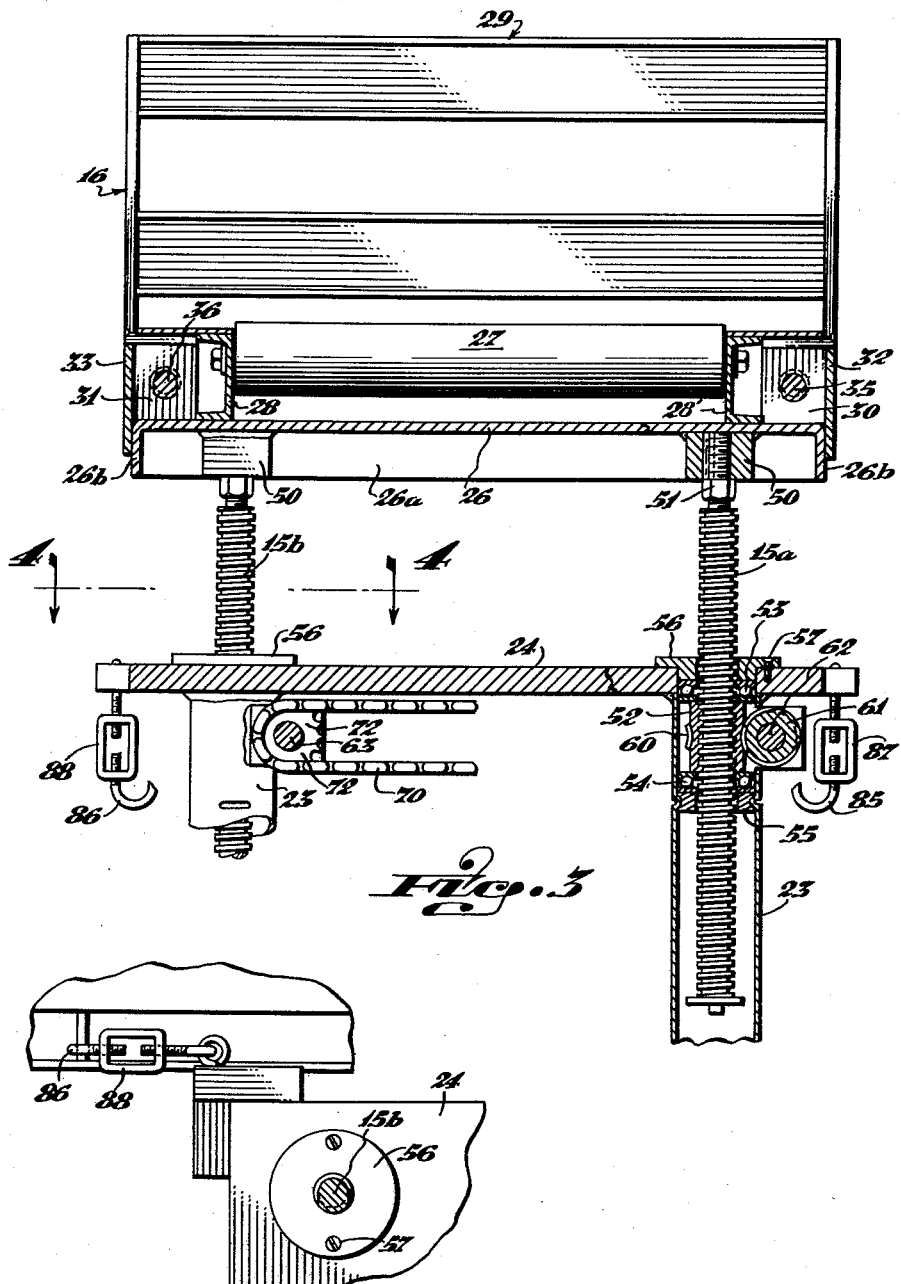

United States Patent Office 3,067,893
Patented Dec. 11, 1962

3,067,893
PORTABLE, ELEVATABLE WORK HANDLING AND LOCATING TABLE
James E. Grove, Hamilton, Ohio, assignor to The Hamilton Tool Company, Hamilton, Ohio, a corporation of Ohio
Filed Nov. 19, 1958, Ser. No. 774,953
1 Claim. (Cl. 214—514)

This invention relates to a portable work handling and locating table that can be used in shops where relatively heavy objects have to be placed on or removed from work benches, for example, or where dies have to be transported to and placed in a punch press or be removed therefrom.

In machine and punch press shops, where heavy work pieces are placed on benches and removed therefrom or dies are placed in a press and removed therefrom, a portable table for those purposes is needed. But, so far as I am aware, no simple, substantially all-purpose portable table has been heretofore available, which is provided with a vertically adjustable conveyor table that can be positioned at work bench or punch press bed height, and which is provided with means for delivering a work piece or die to desired location, or which can be used for the removal of such objects from benches and presses and transported about the shop as needed.

An object of this invention is to provide a portable table having a chassis mounted on wheels, a conveyor table and means for supporting and raising or lowering the table to the required height, and means for moving work along the conveyor to location or returning the same from location to the conveyor.

The foregoing and other objects will be apparent to those of ordinary skill in the art to which the invention pertains from the following description taken in conjunction with the accompanying drawings, in which:

FIG. 2 is a view in horizontal section taken on line 2—2 of FIG. 1.

FIG. 3 is a view in vertical section taken on line 3—3 of FIG. 1.

FIG. 4 is a fragmentary view in transverse section taken on line 4—4 of FIG. 3.

FIG. 5 is a view in section taken in a horizontal plane on line 5—5 of FIG. 1, showing the elevator screws and the drive means therefor.

Figure 1:
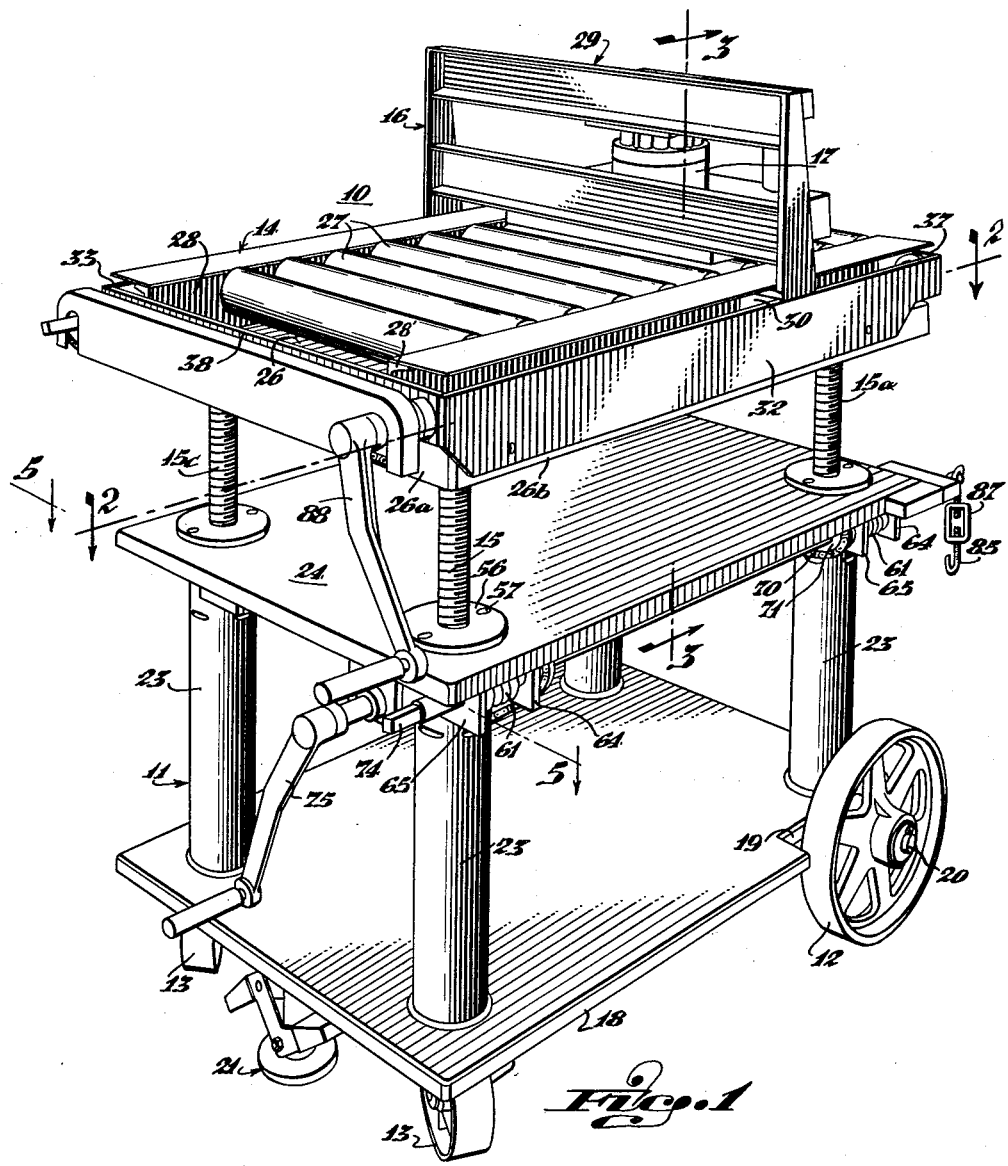
FIG. 1 is a perspective view of a portable conveyor table arranged and constructed in accordance with an embodiment of the invention.

With reference to FIG. 1, a portable table 10 is shown that comprises a chassis 11, mounted on wheels 12 and 13 at the front and rear of the chassis, respectively, and a conveyor table 14 provided with means for raising or lowering the same. The means for raising or lowering the table 14 comprises screws 15, 15a, 15b and 15c.

The table 14 is provided with an object moving device 16 by which a work piece or a die, for example, shown at 17, may be moved off the conveyor to location or pulled from the location back onto the table.

The chassis 11 comprises a lower platform 18 of substantially rectangular shape and provided with notches 19 at the front corners thereof for accommodating the front wheels 12, the latter being mounted on axles 20 secured to the platform. The rear wheels 13 are shown as caster wheels and are rotatable about pins not shown so that the device 10 may be guided as it is moved about from place to place. At the rear end of the platform 18 is a locking device 21 which when placed in operative, lowered, floor-engaging position prevents swinging of the device 10 about its caster wheels, or the front wheels 12. The chassis also comprises vertically extending hollow columns 23 located substantially at the corners of platform 18 and upon which an upper platform 24 is mounted and secured. The platform 24 is parallel to the lower platform 18.

The table 14 is shown more in detail in FIG. 2 and 3. It comprises a platform 26 having downwardly extending flanges 26a and 26b at the ends and sides thereof, a plurality of rollers 27 and support members 28 and 28' extend lengthwise of the table platform 26 in which the ends of the rollers 27 are journaled.

The conveyor is provided with the article moving means 16 that comprises a member 29. The member 29 extends transversely of and bridges the conveyor table and is supported on and secured to traveling nuts 30 and 31. The nuts 30 and 31 are retained on the platform 26 by plates 32 and 33, respectively, secured to the platform as shown.

The article moving member 29 may be moved longitudinally of the conveyor in either direction by means of screws 35 and 36 the ends of which are rotatably mounted in bearings in the end members 37 and 38 of the conveyor frame. These screws cannot move lengthwise but are rotatable. The threads of these screws register with threads in the nuts 30 and 31.

In order that the article moving member 29 may be maintained at right angles to the line of motion of the conveyor and so that it will not cock or bind, means are provided for driving the screws 35 and 36 simultaneously and at the same rotative speed, such as, by way of example, by means of a chain 38a running over sprockets 39 and 40 keyed to the ends of the screws 35 and 36, respectively.

As shown in FIG. 2, stop collars 40 and 41 are pinned to the rearward ends of the screws 35 and 36 at the inside face of the member 38, thus preventing the screws from moving rearwardly as they are turned. The hubs 39a and 40a of the sprockets 39 and 40 are pinned as at 42 and 43 to their respective screws and these hubs have extensions 44 and 45 that abut the outer face of the member 38, thus positively retaining the screws 35 and 36.

As stated above, the conveyor 14 is supported on the elevators 15–15c which comprise screws that are movable vertically. The upper ends of the screws are threaded into blocks 50 (FIG. 3) secured to the underside of the platform 26 and locked thereto by means of lock nuts 51.

As shown in FIG. 3, each screw is provided with a nut 52 mounted between upper and lower thrust bearings 53 and 54. The bearing 54 rests on a support 55 secured to its column 23 and the upper bearing is retained in place by a retainer cap 56 secured as with screws 57 to the upper platform or chassis plate 24. Thus the nut 52 is rotatable about the vertical axis of the screw with which it operates but it cannot move in either direction up or down.

On each nut 52 is a worm wheel 60 that meshes with a worm 61. The worms 61 on one side of the machine are mounted on a shaft 62 and the worms on the other side are mounted on a shaft 63 (FIG. 5). The shafts 62 and 63 are journaled in bearing brackets 64 and 65 and 66 and 67, respectively, that are welded or otherwise suitably secured to its associated column 23.

In order that the elevator screws 15–15c may be raised or lowered in unison, a chain 70 running over sprockets 71 and 72 on the shafts 62 and 63, respectively, is provided. The sprockets are pinned to the shafts as shown in FIG. 5. The shaft 62 may be the drive shaft, in which case the rear end of the shaft is provided with wrench flats 74 to accommodate a crank 75. Thus, by rotating the shaft 62 in one direction or the other, the conveyor assembly 14 may be raised or lowered and be maintained in a fixed position with respect to the horizontal. In other words, the conveyor may be moved vertically either up or down while being maintained in a horizontal position.

The crank 75 is applied to the wrench flats 74 when there is a load on the conveyor assembly 14. However, when there is no load on the platform and it is desired to quickly adjust the position of the conveyor to the level desired, a jack shaft 77 journaled in brackets 78 and 79 secured to the column 23 as shown, may be provided. This shaft is provided with a sprocket 80, a drive chain 81 and a sprocket 82 on the shaft 62. The sprocket 80 is larger than the sprocket 82, as shown, so that when the crank 75 is applied to the end containing the wrench flats 83, the shaft 62 may be rotated at twice, more or less, the speed at which the shaft 77 is rotated.

The portable device 10 may carry a die or any heavy work piece and transport it either to a punch press, work bench or the like. In the case a die is being transported, the device 10 is moved up to the punch press and coupled to it by means of hooks 85 and 86 provided with turnbuckles 87 and 88, respectively, so that the device may be securely anchored relative to the press. The locking device 21 is then operated to secure the machine or table 10. By turning the crank 75, the elevator screws 15–15c are raised or lowered to position the conveyor 14 at the elevation of the die bed on the press. Then member 29 may be actuated via screws 35 and 36 to push or eject the die 17 along the conveyor rollers 27 onto the die bed of the press, work bench, etc. It will be understood, of course, that a block or other member may be placed between the die and the member 29 so that the die can be pushed as far onto the die bed as may be necessary.

It will also be understood that the die may be removed from a die bed or other supporting surface and pulled onto the conveyor 14 by merely coupling the die as by means of a rope or chain to the member 29 and turning the crank 88 in the reverse direction, for rotating screws 35 and 36 to propel member 29 to or toward the rearward end of the machine.

It will be appreciated that the device may be used also to carry heavy objects to or from work benches and that by elevating the conveyor to the level of the bench, it is quite easy to shift the object onto the bench or to replace it on the conveyor.

Having thus described the invention, it will be apparent to those of ordinary skill in the art to which the invention pertains that various modifications and changes may be made within the scope of the appended claim without departing from either the spirit or the scope of the invention.

What is claimed is:

A portable, object-handling apparatus comprising in combination with a chassis structure including two vertically spaced platforms having vertical tubular housings therebetween and maintaining the platforms in said spaced relation, an elongate screw in each tubular housing and projecting above the upper one of said platforms with means operatively connected with and coupling said screws together for up and down movement; a roll-away table overlying said chassis and comprising a platform mounted upon and rigidly secured to the top ends of said screws to be moved vertically by the screws in parallel relation with the underlying chassis platform, a pair of elongate parallel members disposed upon and extending longitudinally of the table platform and spaced apart transversely of the table platform, said members each being adjacent to and spaced inwardly from a longitudinal side of the latter platform, a plurality of relatively long roller members disposed in relatively closely spaced parallel relation across the table platform between said parallel members, said roller members being rotatably connected at their ends to and supported by said parallel members, said rollers having the topmost portions thereof lying in a horizontal plane slightly above the said parallel members, an elongate plate extending along each of said longitudinal sides of the table platform and disposed in a vertical plane spaced outwardly from and parallelling the adjacent one of the parallel members and projecting above the top of the table platform and forming with the adjacent parallel member a guide way, transverse members secured to the table at each end and connecting said longitudinally extending plates and projecting above the top of the table platform, a travelling nut of polygonal contour positioned in each guide way on the table platform and having one side thereof in sliding engagement with and held against turning by the surface of the platform against which it is engaged, a screw extending longitudinally of and in each guide way and passing through and threadably connected with the nut therein, said screws being rotatably supported at their ends by the said transverse members secured to the ends of the table platform, means for rotating one of the last mentioned screws, means operatively coupling the last mentioned screws for simultaneous rotation thereof, and an upstanding structure disposed above the table platform and above said rollers and spanning the table platform and having vertical end members rigidly connected with said travelling nuts to be moved by the latter longitudinally of the table over said rollers upon rotation of the last mentioned screws.

References Cited in the file of this patent

UNITED STATES PATENTS

| | | |
|---|---|---|
| 84,275 | Hammond | Nov. 24, 1868 |
| 160,485 | Thomas et al. | Mar. 2, 1875 |
| 1,693,335 | Damerell | Nov. 27, 1928 |
| 1,789,151 | Moore | Jan. 13, 1931 |
| 1,927,598 | Schlichter | Sept. 19, 1933 |
| 2,002,993 | Ehrick | May 28, 1935 |
| 2,249,126 | Gehlbach | July 15, 1941 |
| 2,379,982 | Mitchell | July 10, 1945 |
| 2,945,600 | Thumin | July 19, 1960 |